(12) United States Patent
Portman et al.

(10) Patent No.: US 8,233,595 B2
(45) Date of Patent: Jul. 31, 2012

(54) SYSTEM AND METHOD FOR FORWARDING A SESSION BASED ON A RECORDING CAPACITY

(75) Inventors: Leon Portman, Rishon Lezion (IL); Stas Margolis, Alfei Menashe (IL); Shay Weiss, Ra'anana (IL); Noam Ben Zeev, Tel Aviv (IL)

(73) Assignee: Nice Systems Ltd., Raanana (IL)

( * ) Notice: Subject to any disclaimer, the term of this patent is extended or adjusted under 35 U.S.C. 154(b) by 1082 days.

(21) Appl. No.: 11/958,141

(22) Filed: Dec. 17, 2007

(65) Prior Publication Data

US 2009/0154689 A1 Jun. 18, 2009

(51) Int. Cl.
*H04M 1/64* (2006.01)
(52) U.S. Cl. ............ 379/88.18; 379/265.06; 379/265.12
(58) Field of Classification Search ............. 379/265.06, 379/34, 265.01, 265.03, 265.12, 266.1; 395/750; 370/260
See application file for complete search history.

(56) References Cited

U.S. PATENT DOCUMENTS

| | | | | |
|---|---|---|---|---|
| 5,446,904 | A * | 8/1995 | Belt et al. ...................... | 713/323 |
| 6,058,163 | A * | 5/2000 | Pattison et al. .......... | 379/265.06 |
| 6,501,839 | B1 * | 12/2002 | Cutting et al. ........... | 379/265.03 |
| 6,801,618 | B2 * | 10/2004 | Nygren et al. ........... | 379/265.06 |
| 7,257,218 | B2 * | 8/2007 | Yoakum .................... | 379/265.01 |
| 7,418,094 | B2 * | 8/2008 | Golitsin et al. .......... | 379/265.12 |
| 7,570,755 | B2 * | 8/2009 | Williams et al. ........... | 379/266.1 |
| 7,693,274 | B2 * | 4/2010 | Eppel et al. .............. | 379/265.01 |
| 2007/0086365 | A1 * | 4/2007 | Chen et al. .................... | 370/260 |

* cited by examiner

*Primary Examiner* — Fan Tsang
*Assistant Examiner* — Van D Huynh
(74) *Attorney, Agent, or Firm* — Pearl Cohen Zedek Latzer, LLP

(57) ABSTRACT

A system and method for forwarding a session based on a recording capacity. A recording sub-system may inform a session forwarding component of a recording capacity associated with agents. A forwarding component may select an agent to handle a session based on a recording capacity associated with the agent. A session may be interrupted if the recording capacity associated with the session is reduced below a predefined level.

26 Claims, 2 Drawing Sheets

SYSTEM AND METHOD FOR FORWARDING A SESSION BASED ON A RECORDING CAPACITY

BACKGROUND OF THE INVENTION

Modern interaction-related environments, such as, for example, call centers, banks, academic institutions, government agencies, health care facilities or web based shopping depend on advanced applications and/or systems to achieve and/or maintain, among other things, high capacity, efficient operation, high level of service and low operational costs.

Recording has become a key feature of interaction-related environments. The demand and need for recording capabilities may be attributed to a host of capabilities that recording may add to systems and applications comprising interaction-related systems. For example, recording of conversations between agents and callers in a call center may enable tools and applications such as, but not limited to, work force management and/or quality management based on recorded calls.

Other than recording calls or sessions between a user or caller and an interaction-related system, recording systems may record additional information. Such additional information may be events and/or information related to the operation of the related system. An illustrative, non-exhaustive list of examples may be: recording the duration of a calls, recording information identifying parties (e.g. client and agent) participating in a call, or recording of the outcome of a call or session, for example, whether a purchase was made or a refund was granted.

Regulations and compliance issues may be another reason for the high demand for recording capabilities in systems and applications supporting interaction-related environments. Operators of interaction-related systems may be forced by regulations to record various aspects of their respective systems' operations.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Unless explicitly stated, the method embodiments described herein are not constrained to a particular order or sequence. Additionally, some of the described method embodiments or elements thereof can occur or be performed at the same point in time.

Figure 1:
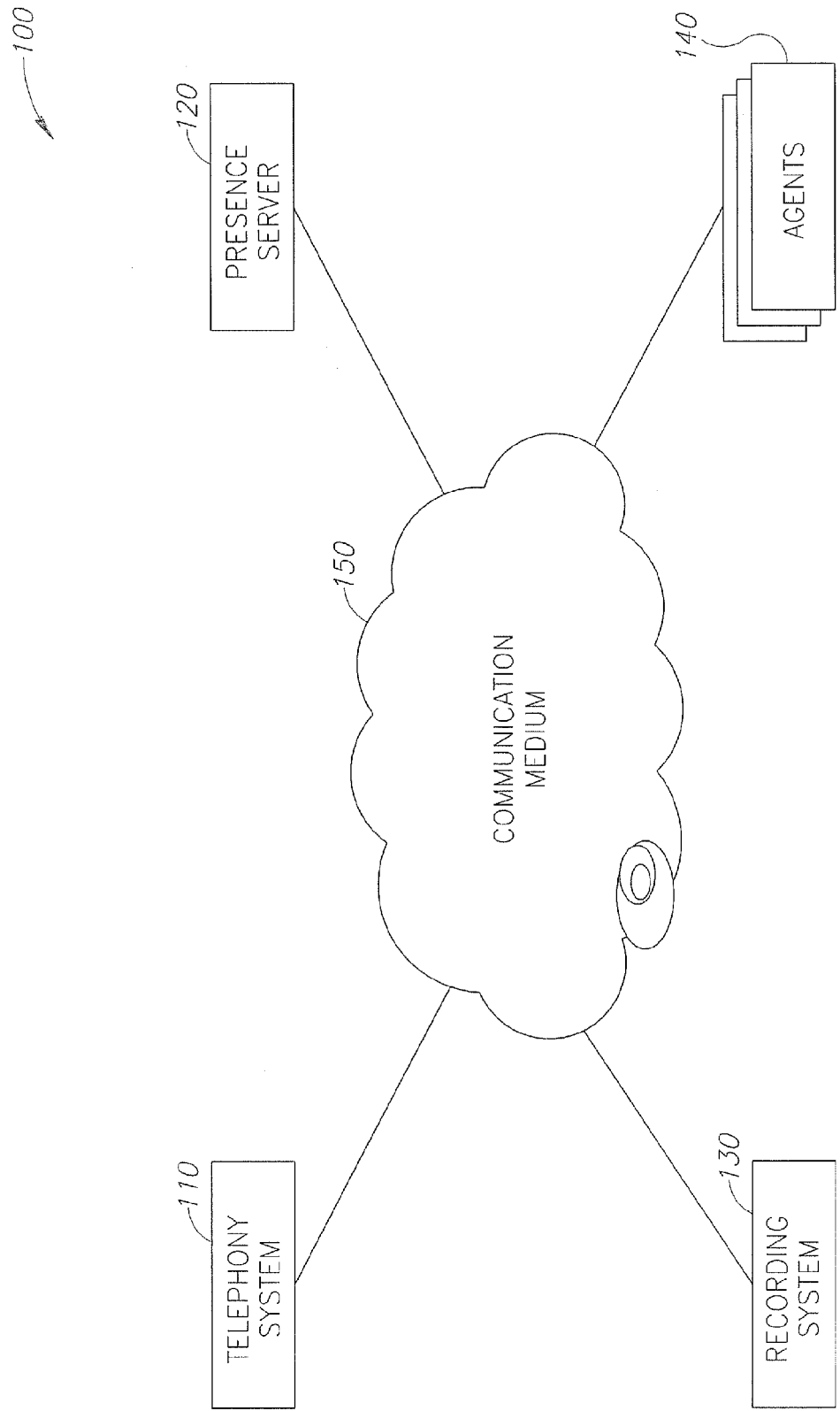
FIG. 1 shows some components of an exemplary interaction-related system according to embodiments of the invention.

Reference is now made to FIG. 1 showing some components of an exemplary interaction-related system 100. System 100 comprises communication or telephony system 110, presence server 120, recording system 130, agents 140 and communication medium 150, all of which are described below. A typical interaction-related system may comprise additional applications, components and/or sub-systems such as, but not limited to, a logging system, a work force management application, a security system, a performance or quality management module and/or system configuration. Such additional components, applications and/or systems are not shown.

According to some embodiments of the invention, communication medium 150 may be a local area network (LAN) connecting telephony system 110, presence server 120, recording system 130 and agents 140. Communication medium 150 may be any other suitable communication medium, for example communication medium 150 may comprise wireless infrastructure, a secured network, an enterprise intranet or private internet protocol (IP) networks. According to some embodiments of the present invention, communication medium 150 may be an enterprise service bus (ESB).

According to some embodiments of the invention, telephony system 110 may comprise a link to a public switched telephone network (PSTN), for example, through a private telephone exchange (PBX), or a private automatic branch exchange (PABX). Telephony system 110 may further comprise a computer-telephony integration (CTI) module. A CTI module may provide the functionality required in order to provide a link between telephone systems and computer systems. According to some embodiments of the invention, telephony system 110 may further comprise a an interactive voice response (IVR) sub-system. An IVR sub-system may perform an initial interaction with incoming sessions. For example, an IVR sub-system may gather information pertaining to an incoming call. Such information may be, for example, a caller identification (CID). An IVR sub-system may further provide a voice-menu in order to prompt a caller to provide further information pertaining to the call and/or the caller. According to some embodiments of the invention, telephony system 110 may further comprise an automatic call distribution (ACD) sub-system. An ACD sub-system may select one of agents 140 to handle an incoming call and may further forward a call to the selected agent.

According to some embodiments of the invention, selecting an agent to handle a call may comprise interacting with presence server 120. Presence server 120 may store and provide information such as, but not limited to, availability of agents 140, special expertise or skills agents 140 may have or location of agents 140.

According to some embodiments of the invention, presence server 120 may further store and/or provide information pertaining to a capacity to record activities of agents 140. According to some embodiments of the invention, recording system 130 may provide presence server 120 with such information. According to some embodiments of the invention, recording system 130 may update presence server 120 regarding a capacity to record calls or sessions. According to some embodiments of the invention, recording system 130 may inform presence server 120 that recording facilities are available, in which case presence server 120 may allow incoming calls, for example by reporting some of agents 140 as present and/or available when queried. Alternatively, if recording system 130 reports to presence server that recording facilities are unavailable, presence server 120 may report agents 140 as unavailable when queried, for example by an ACD sub-system.

According to some embodiments of the invention, recording system 130 may provide presence server 120 with a per-agent recording capacity indication. For example, recording system 130 may inform presence server 120 of a recording capacity for each active agent in the current shift. According to some embodiments of the invention, presence server 120 may store an agent list, listing all agents 140. Such list may comprise an entry for each agent. An entry in turn may contain information fields such as, but not limited to, agent name, agent identification, agent expertise, active/inactive state, availability and/or location. According to some embodiments of the invention, an entry may further comprise a field indicating a recording capacity. According to some embodiments of the invention, such field may simply indicate that recording is either available or unavailable for the relevant agent.

According to some embodiments of the invention, a field (in the list described earlier) pertaining to a recording capacity may further comprise information such as, but not limited to, recording duration limitation, volume capacity, recording speed or recording quality. For example, an entry for an agent may indicate that recording is available for the given agent but with a limitation, or quota imposed. For example, a limitation of 10 minutes of recording time may be indicated. Another example may be an indication of recording quality available, for example, a number of recording quality levels may be defined and one such level may be indicated for a specific agent.

According to embodiments of the invention, recording system 130 may update presence server 120 whenever a change in recording capacity occurs. Such update may comprise updating information pertaining to a specific agent. For example, unavailable resources may become available, consequently enabling recording of calls handled by a specific agent. Such event may cause recording system 130 to inform presence server 120 that recording capacity for the specific agent is restored. According to some embodiments of the invention, an update provided by recording system 130 to presence server 120 may inform presence server 120 that recording facilities are unavailable for all agents. Such update may be performed when recording system 130 experiences a failure that disables any recording, for example, in case of failure of one or more major components of recording system 130.

Recording system 130 may further update information stored within presence server 120 upon reset, or cold or warm boot. Alternatively, or additionally, recording system 130 may update information stored in presence server 120 periodically. Such periodic update may be performed, e.g. as a safeguard, for example, in order to ensure information integrity and coherency.

According to embodiments of the invention, information provided by recording system 130, and possibly stored by presence server 120, may be used by various components comprising system 100. For example, telephony system 110 may comprise logic and/or rules for selecting an agent according to a recording capacity associated with the agent. For example, a rule may dictate that calls from specific callers may only be accepted if they can be recorded. Another exemplary rule may dictate that, for certain callers or caller types, unless a recording capacity of more than 10 minutes is available, calls should not be accepted. Yet another exemplary rule may dictate that calls from a specific domain are to be forwarded to agents who are associated with a high quality recording level.

According to embodiments of the invention, telephony system 110 may query presence server 120 in order to retrieve information regarding a specific agent. Such retrieval may be performed as part of an agent selection process. According to embodiments of the invention, presence server 120 may communicate all or part of the information relevant to a specific agent that presence server 120 has in storage. For example, an entry from the list described earlier may be provided upon request. According to other embodiments of the invention, presence server 120 may provide a list of best suited agents for a given task. For example, in response to a query, presence server 120 may provide a list of all available agents who have a specific required expertise. Such list may further only include agents for whom recording capacity is available.

According to other embodiments of the invention, presence server 120 may update telephony system 110 upon change of status of an agent. For example, if an agent becomes unavailable, presence server 120 may update telephony system 110 of such event. According to some embodiments of the invention, telephony system 110 may maintain an updated list of agents. Such list may provide telephony system 110 with necessary, up to date information in order to assist in selection of an agent to handle an incoming call or session. According to some embodiments of the invention, presence server 120 may update telephony system 110 when a recording capacity for a specific agent changes. According to embodiments of the invention, presence server 120 may alternatively update telephony system 110, possibly by a single message, that recording capacity for all agents has changed. For example, presence server 120 may inform telephony system 110 that recording is unavailable for all agents. Maintaining an updated list, as described, by telephony system 110, may enable, among other things, higher performance and lower response time of system 100. Such lower response time may be made possible due to the fact that telephony system 110 does not need to interact with recording system 130 when selecting an agent to handle an incoming session. By having recording system 130 providing the necessary information to presence server 120, and further having presence server 120 providing the information to telephony system 110, telephony system 110 may possess, in advance, the information required for the selection process.

According to some embodiments of the invention, communication between telephony system 110 and presence server 120 and between presence server 120 and recording system 130 may be according to various paradigms. The communication paradigm may become an issue when system 100 comprises components supplied by more than one vendor. For example, proprietary application program interfaces (API's) may be used. In such case, API's must be provided by the service providers to the service consumers. For example, the vendor of presence server 120 may be required to provide API's for requesting and/or storing agent information.

According to some embodiments of the invention, communication between telephony system 110 and presence serve 120 and between presence server 120 and recording system 130 may be accomplished, at least in part, by session initiation protocol (SIP). Using SIP to communicate presence related messages and/or information may eliminate the need for providing proprietary APIs. Furthermore, SIP presence messages may be easily expanded, allowing for new applications, logic and flows to be defined and integrated into system 100.

Figure 2:
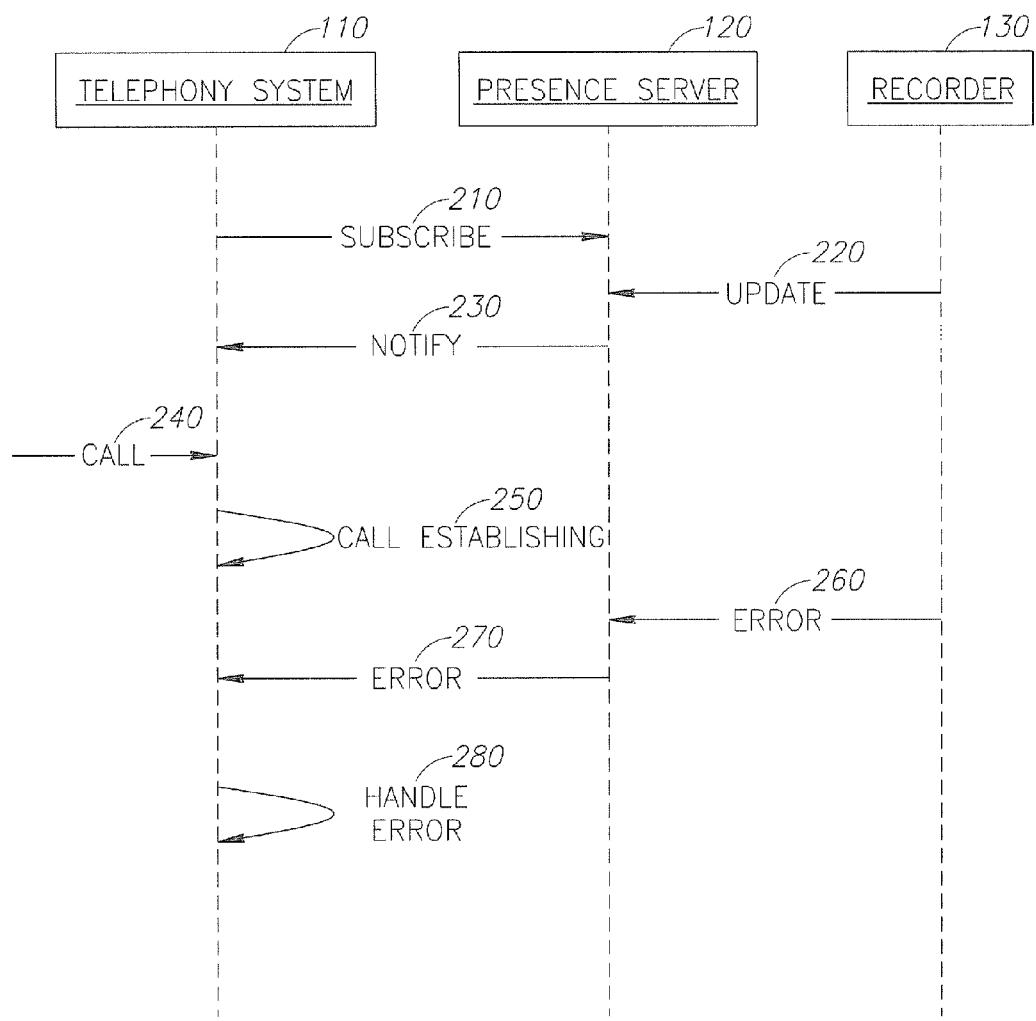
FIG. 2 is a flowchart diagram illustrating an exemplary flow according to some embodiments of the present invention.

Reference is now made to FIG. 2 showing an exemplary flow according to some embodiments of the invention. According to some embodiments of the invention, a flow may comprise a subscription as shown by arrow 210. For example, telephony system 110 may subscribe with presence server 120 in order to receive updates regarding recording capacity changes. According to some embodiments of the invention, a subscription may comprise information identifying an agent for which a subscriber whishes to receive updates, for example, an agent identification or name may be used. According to other embodiments of the invention, a subscriber may subscribe in order to be notified of any changes regarding recording capacity of any or all agents.

According to some embodiments of the invention, a flow may comprise an update as shown by arrow 220. For example, recording system 130 may update presence server 120 of changes regarding a recording capacity. Such update may be related to a specific agent. For example, an update may indicate that recording facilities are available for a specific agent. Alternatively, an update may inform that recording is unavailable for an agent or a group of agents.

According to some embodiments of the invention, a flow may comprise a notification as shown by arrow 230. For example, presence server 120 may notify telephony system 110 of changes in recording capacity. Typically, though not necessarily, presence server 120 may notify telephony system 110 of changes immediately after being informed of such changes, for example by recording system 130. Such behavior may serve to keep telephony system 110 up to date in regard to agents status, particularly the capacity to record agent activities. According to some embodiments of the invention, keeping telephony system 110 up to date regarding agents 140 status and/or state may enable telephony system 110 to select an agent for an incoming call with minimum interaction with other components comprising system 100. Such minimal interaction may yield a significant reduction of response time of system 100 as well as a possible reduction of network and/or computing resources utilization.

According to some embodiments of the invention, a flow may comprise an incoming call as shown by arrow 240. According to some embodiments of the invention, telephony system 110 may handle the incoming call as shown by arrow 250. According to some embodiments of the invention, such handling may comprise selecting an agent to handle the incoming call. According to some embodiments of the invention and as shown by FIG. 2, such selection of an agent may be performed by telephony system 110 with no interaction with other components comprising system 100.

According to some embodiments of the invention, if recording system 130 experiences an error, fault, or otherwise a reduction of its recording capacity, it may report such event to presence server 120 as shown by arrow 260. Such error or fault may be a communication failure, for example, failure to communicate with a storage device. Other examples of errors or faults may be an exhaustion of storage capacity and/or a reduction of storage capacity to below a predefined level. According to some embodiments of the invention, possibly upon being notified of an error by recording system 130, presence server 120 may inform telephony system 110 of the error as shown by arrow 270.

According to some embodiments of the invention, when informed of a problem, error or other malfunction that influences a recording capacity, telephony system 110 may perform an appropriate action as shown by arrow 280. For example, telephony system 110 may interrupt the call and possibly terminate it. According to embodiments of the invention, when informed of a fault pertaining to recording system 130, telephony system 110 may select an alternative recording system (not shown) to handle the recording of the session. According to embodiments of the invention, selection of an alternative recording system may be performed, for example by telephony system 110, based on information provided by presence server 120. For example, multiple recording systems may update presence server 110 as described above and shown by arrow 220. According to embodiments of the invention, presence server 120 may further inform telephony system 110 of recording capacities pertaining to multiple recording systems. According to other embodiments of the invention, instead of interrupting and/or discontinuing a call, or selecting an alternative recording system, telephony system 110 may notify the agent handling the call that the call is no longer being recorded. Such notification may be in the form of a message displayed on a computer display, an audio indication, or any other suitable indication. Provided with the indication as described, the agent handling the call may decide on further actions, for example, the agent may gracefully terminate the call.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A computer-implemented method of selecting an agent to handle an interactive session comprising:
    providing by a recording system, information relating to recording capacity associated with each of a plurality of agents;
    receiving and storing the information in a presence server;
    receiving, by a telephony system, the information from the presence server; and
    selecting, by the telephony system, one of the agents to handle a received interactive session according to a rule based on the information.

2. The method of claim 1, wherein the information relating to recording capacity comprises recording availability indication.

3. The method of claim 1, wherein the information relating to recording capacity comprises at least one of a recording duration limitation, recording volume capacity, recording speed, recording quota and recording quality.

4. The method of claim 1 wherein the rule dictates that a specific agent is to receive the interactive session if recording is available for the specific agent.

5. The method of claim 1, wherein the rule dictates that a specific agent is to receive the interactive session if a certain recording capacity is available for the specific agent.

6. The method of claim 1, wherein the rule dictates that a specific agent is to receive the interactive session if a certain recording capacity is available for the specific agent.

7. The method of claim 1 further comprising:
updating the telephony system by the presence server when a recording capacity for an agent is changed.

8. The method of claim 1 further comprising:
updating the telephony system by the presence server periodically.

9. The method of claim 1, wherein providing the information is performed via session initiating protocol messages.

10. The method of claim 1 further comprising:
reporting by the recording system to the presence server when one of an error, a fault and a reduction of recording capacity occurs; and
informing the telephony system by the presence server that one of an error, a fault and a reduction of recording capacity occurred.

11. The method of claim 10 further comprising:
selecting an alternative recording system to record the received interactive session based on information provided by presence server.

12. The method of claim 10 further comprising:
notifying the agent handling the received interactive session, by the telephony system, that the received interactive session is not being recorded.

13. The method of claim 1 further comprising:
updating the presence server by multiple recording systems regarding their recording capacities; and
updating the telephony system by the presence server of recording capacities pertaining to the multiple recording systems.

14. A communication system for selecting an agent comprising:
a recording system to provide information relating to recording capacity associated with each of a plurality of agents to a presence server, wherein the presence server is to store the information; and
a telephony system to receive the information from the presence server and to select one of the agents to handle a received interactive session according to a rule based on the information.

15. The system of claim 14, wherein the information relating to recording capacity comprises recording availability indication.

16. The system of claim 14, wherein the information relating to recording capacity comprises at least one of a recording duration limitation, recording volume capacity, recording speed, recording quota and recording quality.

17. The system of claim 14, wherein the rule dictates that a specific agent is to receive the interactive session if recording is available for the specific agent.

18. The system of claim 14, wherein the rule dictates that a specific agent is to receive the interactive session if a certain recording capacity is available for the specific agent.

19. The system of claim 14, wherein the rule dictates that a specific agent is to receive the interactive session if a certain recording capacity is available for the specific agent.

20. The system of claim 14, wherein the presence server is to update telephony system when a recording capacity for an agent is changed.

21. The system of claim 14, wherein the presence server is to update telephony system periodically.

22. The system of claim 14 wherein the information is provided to the presence server via session initiating protocol messages.

23. The system of claim 14, wherein the recording system is to report to the presence server when one of an error, a fault and a reduction of recording capacity occurs and wherein the presence server is to inform the telephony system that one of an error, a fault and a reduction of recording capacity occurred.

24. The system of claim 23 wherein the telephony system is to select an alternative recording system to record the received interactive session based on information provided by presence server.

25. The system of claim 23, wherein the telephony system is to notify the agent handling the received interactive session that the received interactive session is not being recorded.

26. The system of claim 14, further comprises multiple recording systems to update the presence server regarding their recording capacities and wherein the presence server is to update the telephony system of recording capacities pertaining to the multiple recording systems.

* * * * *